United States Patent [19]

Powell

[11] Patent Number: 4,797,839
[45] Date of Patent: Jan. 10, 1989

[54] RESOURCE ALLOCATION SYSTEM AND METHOD

[75] Inventor: John H. Powell, Preston, England

[73] Assignee: British Aerospace Public Limited Company, London, England

[21] Appl. No.: 4,853

[22] Filed: Jan. 12, 1987

Related U.S. Application Data

[63] Continuation of Ser. No. 639,429, Aug. 10, 1984, abandoned.

[30] Foreign Application Priority Data

Aug. 13, 1983 [GB] United Kingdom ............... 8321869

[51] Int. Cl.[4] ...................... G06F 15/20; G06F 15/36
[52] U.S. Cl. ................................... 364/554; 364/423
[58] Field of Search ............... 364/400, 401, 402, 403, 364/423, 554

[56] References Cited

U.S. PATENT DOCUMENTS

| | | | |
|---|---|---|---|
| 3,377,471 | 4/1968 | Althaus et al. ...................... | 364/554 |
| 3,725,650 | 4/1973 | Gelder ............................... | 364/402 X |
| 3,808,410 | 4/1974 | Schlesinger ........................ | 364/401 |
| 3,974,481 | 8/1976 | Ledieu et al. ..................... | 364/402 X |
| 4,210,962 | 7/1980 | Marsh et al. ...................... | 364/402 |
| 4,449,041 | 5/1984 | Girard .............................. | 364/423 X |
| 4,459,663 | 7/1984 | Dye .................................. | 364/200 |
| 4,567,566 | 1/1986 | Araya et al. ...................... | 364/554 |

FOREIGN PATENT DOCUMENTS

| | | |
|---|---|---|
| 80/00199 | 2/1980 | PCT Int'l Appl. . |
| 1284421 | 8/1972 | United Kingdom . |
| 1317510 | 5/1973 | United Kingdom . |
| 1390397 | 4/1975 | United Kingdom . |
| 1502420 | 3/1978 | United Kingdom . |

OTHER PUBLICATIONS

A. N. Mucciardi, "Self-Organizing Probability State Variable Parameter Search Algorithms for Systems that Must Avoid High-Penalty Operating Regions", IEEE Transactions on Systems, Man, and Cybernetics, vol. SMC-4, No. 4, Jul. 1974, pp. 350-361.

*Primary Examiner*—Parshotam S. Lall
*Assistant Examiner*—Edward R. Cosimano
*Attorney, Agent, or Firm*—Cushman, Darby and Cushman

[57] ABSTRACT

A resource allocation system for indicating the optimum allocation of a resource between a series of demands iteratively processes the probability data for each demand to determine for each of a range of amounts of resource available the optimum distribution of the resource between the demands and the resultant probability of successfully overcoming all the demands. The system may be used to predict the probability of success where there is a limited resource available and a predicted series of demands, but it may also be used to assess non-predicted threats and to determine an updated optimum distribution and resultant probability.

18 Claims, 3 Drawing Sheets

RESOURCE ALLOCATION SYSTEM AND METHOD

This is a continuation of application Ser. No. 639,429, filed Aug. 10, 1984, which was abandoned upon the filing hereof.

BACKGROUND OF THE INVENTION

1. Field of the Invention

This invention relates to a system for and method of determining the allocation of a resource among a series of demands which require an allocation of the resource, thereby optimizing the probability of successfully overcoming each of the series of demands.

2. Description of the Prior Art

An example of a situation where such demands are present is where a pilot of an aircraft assigned to a mission to a target passing over enemy territory in which there is located a series of threats in the form of ground based missile or gun systems has at its disposal a limited defense suppression resource to defend the aircraft against the enemy threats. It appears that the natural instinct of the pilot when threatened by a missile or gun system is to deploy his resources in the form of chaff, ECM capability etc., against each individual threat as is necessary to make the possibility of destruction of the aircraft by that threat very small. In a case where the aircraft has an infinite amount of resource units, this would not adversely affect mission success, but where, as is usual, the aircraft has only a finite number of resource units, and the aircraft will be subject to many threats during the mission, the pilot in ensuring that the aircraft survives, say, the first threat, in fact may dramatically reduce the probability of the whole mission success even though he maximises the probability of surviving the first threat.

In another instance, the resource could be continuous, in the form of radar-jamming apparatus. In this instance, the pilot of the aircraft needs to know how to allocate the jamming power both in direction and across the frequency band width of the apparatus. For example, for optimum probability of mission success, it may be that the jamming power should be spread evenly across the frequency band width, or, more likely, that a relatively high jamming power be generated at a few isolated frequencies. It will be appreciated that the output waveband may be envisaged as a series of incremental demands.

In yet another instance, the resource may be the path itself taken by the pilot between two or more missile sites located on either side of the mission path. Here, each missile site will have an associated series of threat contours surrounding it, which may or may not be the same for each site. The pilot of the aircraft needs to know the optimum path between the sites having regard to the threat contours of each missile site.

The term "resource" is therefore used in this Specification to denote a variable which may be controlled to enhance the probability of successfully overcoming a threat, that is to say, a demand on that resource. For example, it could be a geographical path, a fuel supply, or a continuous radar jammer, with a limited amount of power available to jam frequencies which can be selected by the operator. In a non-military environment, it could be an annual budget which must be allocated between various commercial departments.

In this Specification, the term "demand success probability data" is used to describe data indicating the respective probability of successfully overcoming a given demand for each amount of resource which may be allocated to it. Thus, in the case of a single demand, the success probability data lists the function $P_{si}(\chi)$ for $0 < \chi < X$, where $P_{si}(\chi)$ is the probability of successfully overcoming the demand i when proportion x of the resource is allocated to it. In the case of a combination of two or more demands, the term "optimum success probability data" is used to describe data indicating the respective optimum probability of successfully overcoming a combination of two or more selected demands, for each available allocation of resource to the combination. Thus, the optimum success probability data lists $P_{SC}(\chi)$ for $0 < \chi < X$ where $P_{SC}(\chi)$ is the maximum probability of successfully overcoming the combination, that is assuming that resource $\chi$ is optimally distributed among the demands of the combination. The term "optimum distribution data" is used to describe data indicating for each available allocation of resource between a combination of demands the respective distribution between the demands which results in the optimum probability of success.

BRIEF SUMMARY OF THE INVENTION

According to one aspect of this invention, there is provided a resource allocation system for indicating the optimum allocation of a resource among a series of demands, the system comprising resource allocation computing means for:

(i) determining demand success probability data for each demand, (ii) combining the demand success probability data of two of the demands for determining optimum success probability data for two demands combined and the optimum distribution data for the two demands combined, (iii) storing the optimum success probability data and the optimum distribution data, (iv) selecting the demand success probability data relating to further demands in turn and for supplying it together with the optimum success probability data for the previous combination of demands to determine updated optimum success probability data for the further demand and the previous combination and the optimum distribution data for the further demand and the previous combination, and (v) repeating the selection and supply, to process the data for the remaining demands so as to determine, for a given amount of resource, the optimum allocation of the resource among the demands, together with the resultant probability of successfully overcoming the demands.

The above system operates on the principle of combining the demand success probability data for two demands to obtain the optimum success probability data for the combination, then combining the data so obtained with the demand success probability data of a further demand to obtain the optimum success probability data for the new combination and so on until all the demands have been processed, at which stage, the maximum probability of successfully overcoming all the demands is known. Also, the optimum distribution of the resource X amongst the demands is known, for each time the success probability data of a demand is supplied together with that of a previous demand or combination of demands to determine updated success probability data for the new combination of demands, the optimum distribution data for that demand is also calculated.

The determination of updated success probability data for combinations of demands is advantageously performed according to the following algorithm:

$$F_n^*(X) = \max_{0 < \chi_n < X} [(1 - P_{Kn}(\chi_n))(F_{n+1}^*(X - \chi_n))]$$

where $F_n^*(X)$ is the optimum success data for the combination of demands n to N; $P_{kn}(\chi_n)$ is the probability of failing successfully to overcome present demand n given allocation of $\chi_n$ resource, and $F_{n+1}^*(X-\chi_n)$ is the optimum success probability data for the combination of demands (n+1) to N inclusive.

It can be seen that the above algorithm provides a forward recursive relationship between successive $F_n^*(X)$ so that the data relating to a present, predicted or non-predicted demand can be used together with the data of a previous demand or combination of demands to determine the optimum allocation of resource to the present demand together with a value for the maximum probability of success for each value of X.

In one arrangement, the system includes data base means which stores demand success probability data for a plurality of demands and demand sensor means adapted to sense and identify a demand and to cause the appropriate demand success probability data to be supplied to the demand storage means. The system then determines the probability of mission success, together with the optimum allocation of resource X amongst the threats.

The system may therefore be used to predict the probability of mission success having regard to:
  (a) a limited countermeasure resource, and
  (b) a predicted series of threats,
but the system also enables non-predicted threats to be assessed and an optimum distribution of resource amongst the predicted and the non-predicted threats to be determined, together with a revised value for the maximum probability of mission success.

In another arrangement, the system is for use in allocating a finite, yet continuous resource against a plurality of threats, for example, in a system which has a limiting jamming power which may be distributed across a relatively large bandwidth to overcome a plurality of demands.

According to another aspect of this invention, there is provided a method of determining the optimum distribution of a resource among a series of demands, the method including the steps of
  (i) determining for each demand the demand success probability data,
  (ii) combining the demand success probability data for the demands to determine the optimum success probability data for the two demands combined and the optimum distribution data for the combined demands,
  (iii) storing the optimum success probability data and the optimum distribution data,
  (iv) combining the optimum success probability data for the two combined demands with the demand success probability data of a further demand, thereby to determine the optimum success probability data and the optimum distribution data for the combination of the two demands and the further demand, and
  (v) continuing the combination of optimum success probability data with remaining demand success probability data in turn until the optimum success probability data and the optimum distribution data for the combination of all the demands has been determined.

BRIEF DESCRIPTION OF THE DRAWINGS

Further features will become apparent from the following description, which is by way of example only, reference being made to the accompanying drawings, in which.

DETAILED DESCRIPTION OF THE PREFERRED EMBODIMENT

The mode of operation of the resource allocation means involves the use of a dynamic programming solution of a situation where there exists a finite resource N which may be allocated towards the servicing of a predicted series of demands occurring at epoch $t_i$, and it is wished to find the optimum allocation of this resource N among the demands.

The objective function which relates the probability of successfully overcoming a present demand to the amount of resource allocated to it is denoted by $$P_{si}(X) = 1 - P_{ki}(X).$$

Where $P_{ki}$ (the probability of failing to successfully overcome a present demand) is well-defined, not necessarily analytic and will in general be monotonically increasing with X. It is assumed, however, that $P_{ki}$ is of a general form and may indeed have a maximum value within its range.

The estimated mission success probability for the remaining demands in the mission given that there is a remaining resource X is denoted by $F_n(X)$. $F_n(X)$ will, in most cases, depend on the distribution of the remaining resource X amongst the remaining demands and $F_n^*(X)$ is defined as the estimated maximum mission success probability assuming that the remaining resource X is optimally allocated over the remainder of the mission, that is the optimum success probability data for the combined remaining demands.

It can be seen that $$F_n^*(X) = \max_{0 < \chi_n < X} [(1 - P_{kn}(\chi_n))(F_{n+1}^*(X - \chi_n))] \quad (I)$$

This constitutes a forward recursive relation between successive $F_n^*(X)$ and is the basis for the dynamic programming solution to this case.

The number of demands in any single mission will be finite, and either discrete or continuous, say 1...N, and it can be appreciated that having successfully overcome the last demand N, the probability of successfully completing the remainder of the mission is unity and hence it is known that $F_{N+1}(=)1$.

From Equation (I) is obtained $$F_N^*(X) = \max_{0 < x_N < X}[(1 - P_{kN}(x_N)) \times 1].$$

Then knowing $F_N^*(X)$, $F_{N-1}^*(X)$ can be calculated and so on all the way back to $F_1^*(X)$, at each stage obtaining $F_n^*(X)$ and $x_n^*$ for each available option of remaining resource X. When $F_n^*(x)$ is the optimum success probability data for threats n to N combined, and $x_n^*$ is the optimum allocation of resource to threat n, both values being dependent on the value of X, that is the amount of resource available at that stage.

EXAMPLE

Consider a mission which includes four predicted demands/threats which have a $P_k$ function as calculated and stored by the resource allocation means in the manner indicated by steps 30 to 35 in FIG. 3 and as shown in tables A and B below:

TABLE A

| | Threats 1 and 3 | | | | | | |
|---|---|---|---|---|---|---|---|
| Allocation ($\chi$) | 0 | 1 | 2 | 3 | 4 | 5 | 6 |
| Resulting $P_k$ | 0.6 | 0.6 | 0.2 | 0.1 | 0.1 | 0.1 | 0.1 |

(probability of failing to successfully overcome threat 1 or 3)

TABLE B

| | Threats 2 and 4 | | | | | | |
|---|---|---|---|---|---|---|---|
| Allocation ($\chi$) | 0 | 1 | 2 | 3 | 4 | 5 | 6 |
| Resulting $P_k$ | 0.7 | 0.68 | 0.65 | 0.5 | 0.2 | 0.1 | 0.1 |

(probability of failing to successfully overcome threat 2 or 4)

The recursive relation already established for the estimated maximum mission success probability (see equation (I) above) is $$F_n^*(X) = \max_{0 < x_n < X}[(1 - P_{kn}(x_n)) F_{n+1}^*(X - x_n)]$$

where X is the remaining resource, n is the nth threat (=4) and $x_n$ is the allocation of resources to the nth threat. Since $F_n(X)=1$ for $n>4$, we have $$F_4^*(X) = \max_{0 < x_4 < X}(1 - P_{k4}(x_4))$$

Hence $F_4^*(O) = 1 - P_{k4}(O) = 0.3$, $\chi_4 = 0$ $F_4^*(1) = 1 - P_{k4}(1) = 0.32$, $\chi_4 = 1$ etc. Table 1 shows the variation of maximum mission success probability $F_4^*(x)$ and the associated optimum resource allocation $x_4^*$ for dealing with the fourth threat, for finally remaining resource values x up to 11.

TABLE 1

| X | $F_4^*(x)$ | $\chi_4^*$ |
|---|---|---|
| 0 | 0.3 | 0 |
| 1 | 0.32 | 1 |
| 2 | 0.35 | 2 |
| 3 | 0.5 | 3 |

TABLE 1-continued

| X | $F_4^*(x)$ | $\chi_4^*$ |
|---|---|---|
| 4 | 0.8 | 4 |
| 5 | 0.9 | 5 |
| 6 | 0.9 | 6 |
| 7 | 0.9 | 7 |
| 8 | 0.9 | 8 |
| 9 | 0.9 | 9 |
| 10 | 0.9 | 10 |
| 11 | 0.9 | 11 |

Note that because threat 4 is the last threat to overcome the optimum allocation of remaining resources, $x_4^*$ is equal to the remaining resource x whatever its value. However, note also that no advantage is obtained by deploying more than 5 resources against threat 4 even if more resources are available.

To determine $F_3^*(X)$ the following recursive relation is used:

$$F_3^*(X) = \max_{0 < x_3 < X}[(1 - P_{k3}(x_3)) F_4^*(X - x_3)]$$

where, knowing $F_4^*$, all the terms on the right-hand side are known. Table 2 shows the variation of maximum mission success probability $F_3^*(x)$ taking into account the third and fourth threats and the associated optimum resource allocation $x_3^*$ for dealing with the third threat, for remaining resource values x up to 10.

TABLE 2

| X | $F_3^*(x)$ | $\chi_3^*$ |
|---|---|---|
| 0 | 0.12 | 0 |
| 1 | 0.128 | 0 |
| 2 | 0.24 | 2 |
| 3 | 0.27 | 3 |
| 4 | 0.32 | 0 |
| 5 | 0.36 | 0 |
| 6 | 0.64 | 2 |
| 7 | 0.72 | 2 or 3 |
| 8 | 0.81 | 3 |
| 9 | 0.81 | 2 or 3 |
| 10 | 0.81 | 2, 3 or 4 |

Note here that we see alternative optimum allocations where it makes no difference to the outcome if, for example, one has 9 units remaining, whether 2 are used and 7 retained or whether 3 are used and 6 saved for use against threat 4. The predicted outcome (a mission success probability of 0.81) is the same. In practice an arbitrary rule will be employed to resolve such alternatives.

To determine $F_2^*(x)$, the following relation is used $$F_2^*(X) = \max_{0 < x_2 < X}[(1 - P_{k2}(x_2)) F_3^*(x - x_2)]$$

This leads to Table 3 which defines $F_2^*(X)$ and $x_2$ in a manner similar to the definition of $F_3^*(x)$ and $x_3^*$ in Table 2.

TABLE 3

| X | $F_2^*(x)$ | $\chi_2^*$ |
|---|---|---|
| 0 | 0.036 | 0 |
| 1 | 0.0384 | 0 or 1 |
| 2 | 0.072 | 0 |
| 3 | 0.081 | 0 |
| 4 | 0.096 | 0 or 4 |
| 5 | 0.120 | 3 |
| 6 | 0.192 | 0 |

TABLE 3-continued

| X | $F_2^*(x)$ | $X_2^*$ |
|---|---|---|
| 7 | 0.216 | 0, 4 or 5 |
| 8 | 0.256 | 4 |
| 9 | 0.320 | 3 |
| 10 | 0.512 | 4 |

Having calculated $F^*_2(X)$ we can now proceed in a similar manner to calculate the overall mission success probability $F^*_1(x)$ and the associated optimum allocation of initial resources for dealing with the first of the predicted set of 4 threats for initial resource values x from 1 to 10. The result is shown in Table 4 below.

TABLE 4

| x | $F_1^*(x)$ | $X_1^*$ |
|---|---|---|
| 0 | 0.0144 | 0 |
| 1 | 0.01536 | 0 |
| 2 | 0.0288 | 2 |
| 3 | 0.0324 | 0 or 3 |
| 4 | 0.0576 | 2 |
| 5 | 0.0648 | 2 or 3 |
| 6 | 0.0768 | 2 |
| 7 | 0.0960 | 2 |
| 8 | 0.108 | 3 |
| 9 | 0.173 | 2 |
| 10 | 0.205 | 2 |

Tables 1 to 4 give the complete solution for the optional allocation of resources over the projected threat. For example, if the mission is begun with 10 units of resource, it can be seen that (a) the mission success probability is just over 20%, and (b) on arriving at the first threat, 2 units should be deployed (leaving 8).

Examining $F^*_2(8)$, it is found that 4 units should be deployed (leaving 4); $F^*_3(4)$ shows that no resource should be allocated to threat 3, leaving 4 remaining to use against the last threat. Table 5 shows this optimum resource allocation for maximum mission success probability.

TABLE 5

| Threat No. | 1 | 2 | 3 | 4 | |
|---|---|---|---|---|---|
| Allocation | 2 | 4 | 0 | 4 | Mission |
| Resource remaining | 8 | 4 | 4 | 0 | Success PROB = 0.205 |

One interesting characteristic of the resource allocation means is its robustness. Assume that the human operator, on encountering the first threat panics and deploys 4 units instead of the optimal 2. The resource allocation means then proceeds to deploy the remaining 6 units in an optimal manner, making, as it were, the best of the bad job done by the operator. Table 6 shows this initially non-optimized but subsequently optimized allocation of resources.

TABLE 6

| Threat No. | 1 | 2 | 3 | 4 |
|---|---|---|---|---|
| Allocation | 4 | 0 | 2 | 4 |
| Resource remain | 6 | 6 | 4 | 0 |

Here, the mission success probability is $0.9 \times 0.192 = 0.1728$ so that by deploying too soon, the operator reduces the mission success, even though the resource allocation means optimises the subsequent allocation.

In summary, the variation of the optimal allocation of resources for dealing with 4 predicted threats with various numbers of starting resources is as shown in Table 7.

TABLE 7

| STARTING RESOURCE | ALLOCATION TO THREAT 1 | ALLOCATION TO THREAT 2 | ALLOCATION TO THREAT 3 | ALLOCATION TO THREAT 4 | MISSION SUCCESS PROBABILITY |
|---|---|---|---|---|---|
| 0 | 0 | 0 | 0 | 0 | 1.4% |
| 1 | 0 | 0 | 0 | 1 | 1.5% |
| 2 | 2 | 0 | 0 | 0 | 2.9% |
| 3 | 0/3 | 0 | 3/0 | 0 | 3.2% |
| 4 | 2 | 0 | 2 | 0 | 5.8% |
| 5 | 2/3 | 0 | 3/2 | 0 | 6.5% |
| 6 | 2 | 0 | 0 | 4 | 7.7% |
| 7 | 2 | 3 | 2 | 0 | 9.6% |
| 8 | 3 | 3 | 2 | 0 | 10.8% |
| 9 | 2 | 0 | 2 | 5 | 17.3% |
| 10 | 2 | 4 | 0 | 4 | 20.5% |

Figure 3:
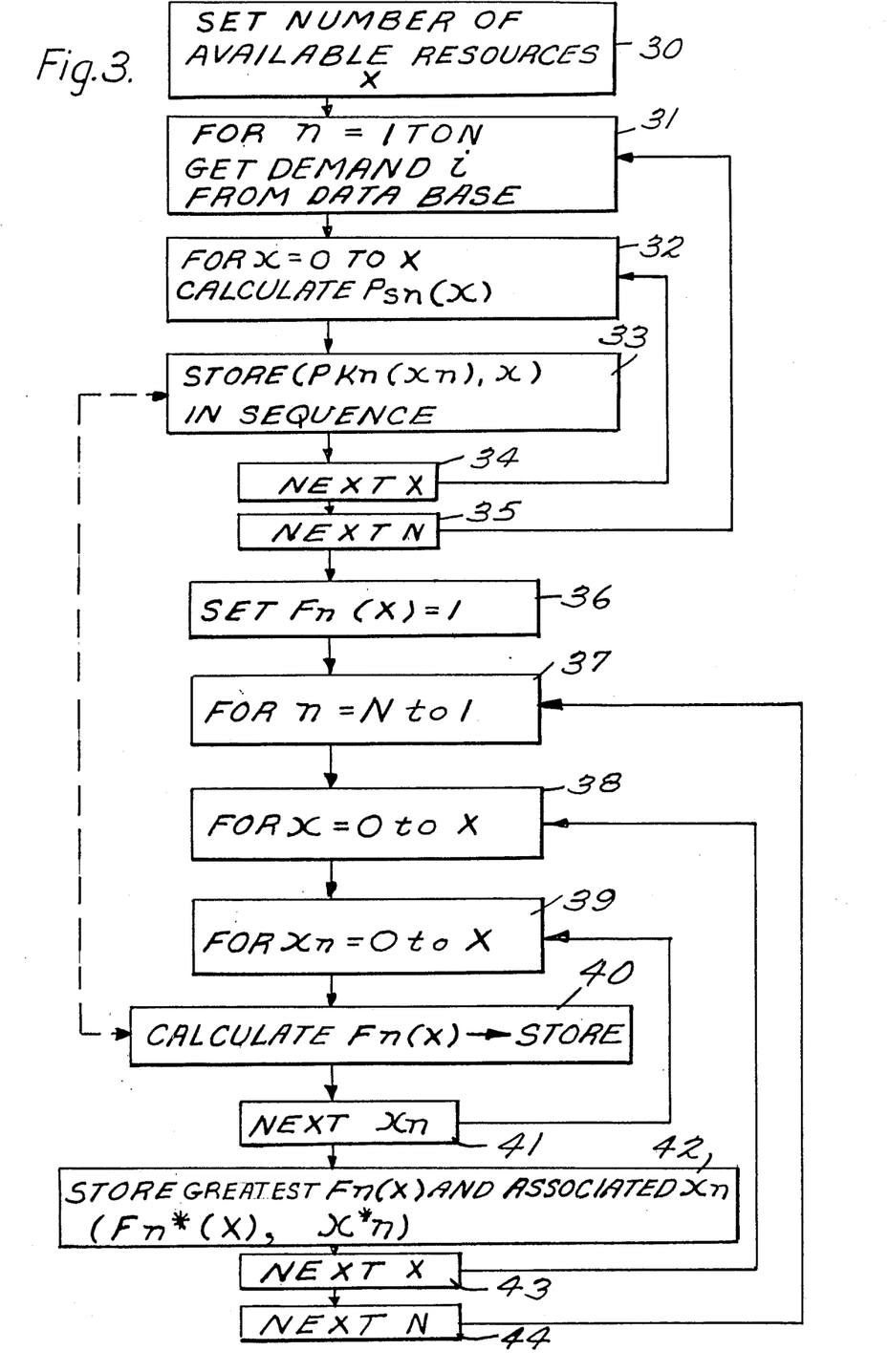
FIG. 3 is a flow diagram illustrating the initial mode of operation of the resource allocation means.

Such a look-up table can be calculated by the resource allocation means in a manner illustrated by steps 36 to 44 in FIG. 3. It will be observed that, in general, if there is a very limited resource available, it is not spread thinly around the remaining threats, but is allocated to one or two of the threats. This is illustrated neatly in the table corresponding to $F^*_1(X)$ where $F^*_1(3)$ is produced by allocating either all or none of the resource. If an attempt either all or none of the resource. If an attempt is made to "hedge one's bets" a sub-optimum solution is produced.

Figure 1:
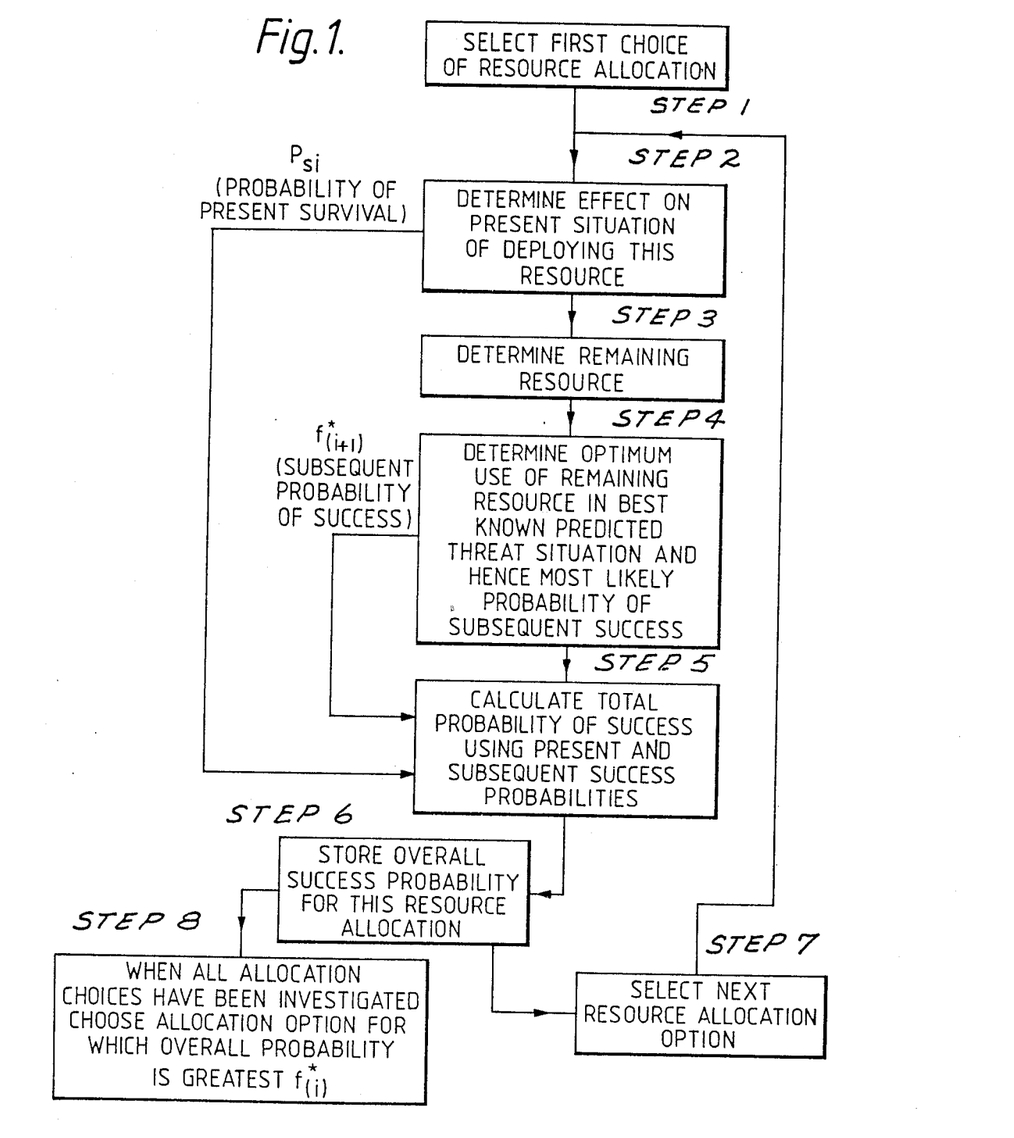
FIG. 1 is a flow diagram illustrating the real-time mode of operation of the resource allocation means

Having described how the resource allocation means determines the optimum distribution of a finite resource amongst a series of predicted threats and the resultant probability of mission success (for example, as shown by the flow control diagram of FIG. 3), reference is now made to FIG. 1 which shows how a system may operate to determine the optimum distribution of a finite resource amongst a series of predicted threats in combination with a present, non-predicted threat. It is assumed that the optimum success probability data for dealing with the predicted treats and the optimum distribution data have been determined by the system as before. Table 7 is an example of the result of one such determination.

It will be assumed for the purpose of the following description that the present non-predicted threat is occurring before any one of the predicted threats are encountered, but clearly the system can be made to re-optimize the use of remaining resource wherever a non-predicted threat occurs in the sequence of predicted threats.

Initially, a first choice of resource allocation is selected (step 1 in the flow diagram) and the effect on the present non-predicted threat of deploying this choice is determined (step 2) using a database of intelligence (11 in FIG. 2) to determine the probability of successfully overcoming the present threat $P_{si}$ given deployment of the first choice of resource allocation.

The remaining resource is then determined (step 3) and then used with the previously determined $F^*_n(X)$ (as above in Table 7 for 4 predicted threats) for the combination of the predicted threats yet to come to determine the maximum possible probability of successfully overcoming the predicted threats yet to come $P_{(i+1)}$ given the remaining resource (step 4).

This probability $P_{(i+1)}$ is then combined with the probability of successfully overcoming the present threat $P_{si}$ thus to calculate the overall probability of success (step 5), which is stored (step 6).

A next choice of resource allocation is then selected (step 7) and the process are repeated until all allocation choices have been investigated and all the stored overall success probabilities are compared to find the greatest and also to indicate which choice of allocation of the resource should be allocated to the present threat (step 8).

Figure 2:
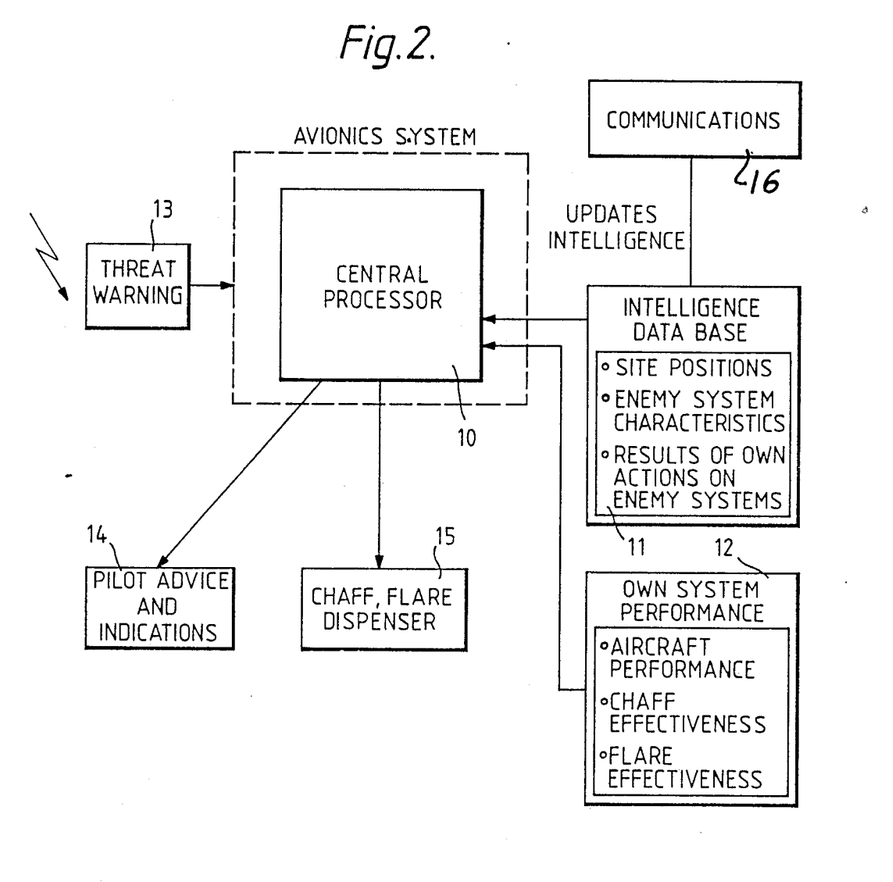
FIG. 2 is a schematic diagram illustrating the use of the resource allocation means in an aircraft subject to a plurality of predicted and non-predicted threats.

Referring now to FIG. 2, there is shown a system for use in an aircraft to advise the Pilot of the aircraft of the optimum allocation of resources in response to a number of threats. In this instance, the threat is in the form of a plurality of enemy missile sites located near the mission path, and the resource is in the form of chaff and flare cartridges.

The system comprises a central processor 10 which serves as the resource allocation means (whose operation has been described with reference to FIGS. 1 and 3 above) and which receives data from an intelligence data base 11 and a system performance data base 12 to combine them to deduce demand success probability data which relates the probability of successfully overcoming a given threat to the number of units of resource allocated to it, as in Tables A and B in the example above, and storing the data in an internal memory.

The intelligence data base 11 contains data relating to the predicted enemy missile site positions, the enemy system characteristics and the results of pilot's actions on enemy systems. The intelligence data base 11 may be updated via a communications system 16, for example, to indicate that an enemy missile system has been removed or replaced by a missile system of different characteristics of if a missile system exists near the mission path where previously there was thought to be none.

The system performance data base 12 contains data relating to aircraft performance and vulnerability and chaff and flare effectiveness.

The system also includes a threat warning device 13 which alerts the system when a threat is perceived, and a display 14 which indicates to the Pilot the optimum allocation of the chaff and flare cartridges and the probability of mission success on the basis of optimum distribution of the resources amongst the predicted threats. The processor 10 may also or alternatively control deployment of the sources automatically via chaff and flare dispenser 15.

The system continuously updates the probability of successfully overcoming the remaining predicted threats, and this information may be used to make a decision whether to proceed with the intended mission or to proceed with another mission of which the probability of success is greater, or whether merely to return to base.

It can be seen therefore that given sufficient processing capacity, resource allocation means of this kind may be used as the basis of a processing intensive track optimisation routine whereby the expected track is defined by way points which are moved by increments, the mission success probability being calculated on each increment to produce a locally optimum path.

The system is robust in that it continues to allocate resources in an optimum manner ever after non-optimum allocation during an earlier part of the mission. The system may be used as the basis of a decision theoretic mission planning routine.

It will be apparent to one skilled in the art that, whilst in the example given, the threats and the units of resource are discrete, the system may be extended to those situations where the threats and/or the units of resource are continuous.

I claim:

1. A resource allocation system for optimally allocating a physical source among a series of demands on said physical resource, said system comprising:
   resource allocation computing means having memory means, said resource allocation computing means:
   (i) determining demand success probability data for each demand,
   (ii) combining the demand success probability data of two of said demands, thereby to determine the optimum success probability data for the two demands combined and the optimum distribution data for the two demands combined,
   (iii) storing the optimum success probability data and the optimum distribution data in said memory means,
   (iv) selecting the demand success probability data relating to further demands in turn and processing this data, together with the optimum success probability data for the previous combination of demands previously determined, to determine updated optimum success probability data for the further demand and the previous combination and to determine the optimum distribution data for the further demand and the previous combination, and
   (v) repeating said selecting and processing so as to process the data for the remaining demands and so as to determine for a given amount of said physical resource the optimum allocation of the physical resource among the demands together with the resultant probability of successfully overcoming the demands, and
   means connected to said resource allocation computing means for physically indicating how the physical resource should be optimally allocated in response to said demands.

2. A resource allocation system as claimed in claim 1, wherein the optimum distribution of a physical resource X among a series of demands 1 . . . N is determined by said resource allocation computing means by combining the demand success probability data according to the following algorithm:

$$F_n^*(X) = \max_{0 < x_n < X} [(1 - P_{kn}(x_n))(F_{n+1}^*(X - x_n))]$$

where $F^*_n(X)$ is the optimum success probability data for the combination of demands n to N inclusive; $P_{kn}(x_n)$ is the probability of failing successfully to overcome present demand n given allocation of $x_n$ resource; and $F^*_{n+1}(X-x_n)$ is the optimum success probability data for the combination of demands n+1 to N inclusive.

3. A resource allocation system as claimed in claim 1, further including data base means for storing demand success probability data for a plurality of different demands, and demand sensor module means for sensing and identifying a demand and for causing the appropriate demand success probability data to be supplied to said resource allocation computing means for processing.

4. A method of optimally allocating a physical resource among a series of demands on said physical resource, said method including the steps of:
  (i) determining for each demand the demand success probability data,
  (ii) combining the demand success probability data for two demands, thereby to determine the optimum success probability data for the two demands combined and the optimum distribution data for the combined demands,
  (iii) storing the optimum success probability data and the optimum distribution data,
  (iv) combining the optimum success probability data for the two combined demands with the demand success probability data of a further demand thereby to determine the optimum success probability data and the optimum distribution data for the combination of said two demands and said further demand,
  (v) continuing said combination of optimum success probability data with remaining demand success probability data in turn until the optimum success probability data and the optimum distribution data for the combination of all the demands has been determined, and
  (vi) physically indicating how the physical resource should be optimally allocated in response to said demands according to said determination.

5. A method in accordance with claim 4, wherein the combination of demand success probability data in steps (ii), (iv) and (v) for a series of demands 1 ... N is determined by combining the demand success probability data according to the following algorithm:

$$F_n^*(X) = \genfrac{}{}{0pt}{}{\max}{0 < x_n < X}[(1 - P_{kn}(x_n))(F_{n+1}^*(X - x_n))]$$

where $F^*_n(X)$ is the optimum success probability data for the combination of demands n to N inclusive; $P_{kn}(x_n)$ is the probability of failing successfully to overcome present demand n given allocation of $x_n$ resource; $F^*_{n+1}(X-x_n)$ is the optimum success probability data for the combination of demands n+1 to N inclusive.

6. A resource allocation system for controlling the optimum allocation of a physical resource among a series of demands on said physical resource, said system comprising:
  resource allocation computing means having memory means, said resource allocation computing means:
  (i) determining demand success probability data for each demand,
  (ii) combining the demand success probability data of two of said demands, thereby to determine the optimum success probability data for the two demands combined and the optimum distribution data for the two demands combined,
  (iii) storing the optimum success probability data and the optimum distribution data in said memory means,
  (iv) selecting the demand success probability data relating to further demands in turn and processing this data, together with the optimum success probability data for the previous combination of demands previously determined, to determine updated optimum success probability data for the further demand and the previous combination and to determine the optimum distribution data for the further demand and the previous combination, and
  (v) repeating said selecting and processing so as to process the data for the remaining demands and so as to determine for a given amount of said physical resource the optimum allocation of the physical resource among the demands together with the resultant probability of successfully overcoming the demands, and
  means connected to said resource allocation computing means for controlling the allocation of said physical resource in accordance with the determined optimum allocation of said physical resource.

7. A resource allocation system as claimed in claim 6, wherein the optimum distribution of a physical resource X among a series of demands 1 ... N is determined by said resource allocation computing means by combining the demand success probability data according to the following algorithm:

$$F_n^*(X) = \genfrac{}{}{0pt}{}{\max}{0 < x_n < X}[(1 - P_{kn}(x_n))(F_{n+1}^*(X - x_n))]$$

where $F^*_n(X)$ is the optimum success probability data for the combination of demands n to N inclusive; $P_{kn}(x_n)$ is the probability of failing successfully to overcome present demand n given allocation of $x_n$ resource; and $F^*_{n+1}(X-x_n)$ is the optimum success probability data for the combination of demands n+1 to N inclusive.

8. A resource allocation system as claimed in claim 6, further including data base means for storing demand success probability data for a plurality of different demands, and demand sensor module means for sensing and identifying a demand and for causing the appropriate demand success probability data to be supplied to said resource allocation computing means for processing.

9. A method of controlling the optimum distribution of a physical resource among a series of demands on said physical resource, said method including the steps of:
  (i) determining for each demand the demand success probability data,
  (ii) combining the demand success probability data for two demands, thereby to determine the optimum success probability data for the two demands combined and the optimum distribution data for the combined demands,
  (iii) storing the optimum success probability data and the optimum distribution data, (iv) combining the optimum success probability data for the two combined demands with the demand success probability data of a further demand thereby to determine the optimum success probability data and the optimum distribution data for the combination of said two demands and said further demand, (v) continuing said combination of optimum success probability data with remaining demand success probability data in turn until the optimum success probability data and the optimum distribution data for the combination of all the demands has been determined, and (vi) controlling the distribution of said physical resource in an optimum manner according to said determination.

10. A method in accordance with claim 9, wherein the combination of demand success probability data in steps (ii), (iv) and (v) for a series of demands 1 ... N is determined by combining the demand success probability data according to the following algorithm:

$$F_n^*(X) = \max_{0 \,<\, x_n \,<\, X}[(1 - P_{kn}(x_n))(F_{n+1}^*(X - x_n)]$$

where $F^*_n(X)$ is the optimum success probability data for the combination of demands n to N inclusive; $P_{kn}(x_n)$ is the probability of failing successfully to overcome present demand n given allocation of $x_n$ resource; and $F^*_{n+1}(X-x_n)$ is the optimum success probability data for the combination of demands n+1 to N inclusive.

11. A resource allocation system for indicating the optimum allocation of a physical resource among a series of demands on said physical resource, said system comprising:

demand sensor module means for sensing and identifying demands on said physical resource, resource allocation computing means having memory means, said resource allocation computing means:

(i) determining demand success probability data for each demand identified by said demand sensor module means, (ii) combining the demand success probability data of two of said demands, thereby to determine the optimum success probability data for the two demands combined and the optimum distribution data for the two demands combined, (iii) storing the optimum success probability data and the optimum distribution data in said memory means, (iv) selecting the demand success probability data relating to further demands in turn and processing this data, together with the optimum success probability data for the previous combination of demands previously determined, to determine updated optimum success probability data for the further demand and the previous combination and to determine the optimum distribution data for the further demand and the previous combination, and (v) repeating said selecting and processing so as to process the data for the remaining demands and so as to determine for a given amount of said physical resource the optimum allocation of the physical resource among the demands together with the resultant probability of successfully overcoming the demands, and means connected to said resource allocation computing means for physically indicating at least said optimum allocation of the physical resource.

12. A method of indicating the optimum distribution of a physical resource among a series of demands on said physical resource, said method including the steps of:

(i) sensing and identifying demands on said physical resource, (ii) determining for each demand identified in said sensing and identifying step the demand success probability data, (iii) combining the demand success probability data for two of said identified demands, thereby to determine the optimum success probability data for the two demands combined and the optimum distribution data for the combined demands, (iv) storing the optimum success probability data and the optimum distribution data, (v) combining the optimum success probability data for the two combined demands with the demand success probability data of a further demand thereby to determine the optimum success probability data and the optimum distribution data for the combination of said two demands and said further demand, (vi) continuing said combination of optimum success probability data with remaining demand success probability data in turn until the optimum success probability data and the optimum distribution data for the combination of all the identified demands has been determined, and (vii) physically indicating the distribution of the physical resource in an optimum manner according to said determination.

13. A resource allocation system for indicating to the pilot of an aircraft the optimum allocation of a resource of said aircraft among a series of demands on said resource, said system comprising:

resource allocation computing means having memory means, said resource allocation computing means:

(i) determining demand success probability data for each demand, (ii) combining the demand success probability data of two of said demands, thereby to determine the optimum success probability data for the two demands combined and the optimum distribution data for the two demands combined, (iii) storing the optimum success probability data and the optimum distribution data in said memory means, (iv) selecting the demand success probability data relating to further demands in turn and processing this data, together with the optimum success probability data for the previous combination of demands previously determined, to determine updated optimum success probability data for the further demand and the previous combination and to determine the optimum distribution data for the further demand and the previous combination, and (v) repeating said selecting and processing so as to process the data for the remaining demands and so as to determine for a given amount of said resource the optimum allocation of the resource among the demands together with the resultant probability of successfully overcoming the demands, and means connected to said resource allocation computing means for physically indicating to said pilot how said resource should be optimally allocated by said pilot in response to said demands.

14. A resource allocation system as claimed in claim 13, wherein said resource is radar-jamming power.

15. A resource allocation system as claimed in claim 13, wherein said resource is a mission path.

16. A resource allocation system as claimed in claim 13, wherein said resource is the fuel supply of said aircraft.

17. A resource allocation system for optimally allocating an energy consuming resource among a series of demands on said energy consuming resource, said system comprising:

resource allocation computing means having memory means, said resource allocation computing means:
(i) determining demand success probability data for each demand,
(ii) combining the demand success probability data of two of said demands, thereby to determine the optimum success probability data for the two demands combined and the optimum distribution data for the two demands combined,
(iii) storing the optimum success probability data and the optimum distribution data in said memory means,
(iv) selecting the demand success probability data relating to further demands in turn and processing this data, together with the optimum success probability data for the previous combination of demands previously determined, to determine updated optimum success probability data for the further demand and the previous combination and to determine the optimum distribution data for the further demand and the previous combination, and
(v) repeating said selecting and processing so as to process the data for the remaining demands and so as to determine for a given amount of said energy consuming resource the optimum allocation of the energy consuming resource among the demands together with the resultant probability of successfully overcoming the demands, and means connected to said resource allocation computing means for physically indicating how said energy consuming resource should be optimally allocated in response to said demands.

18. A method of optimally allocating an energy consuming resource among a series of demands on said energy consuming resource, said method including the steps of:
(i) determining for each demand the demand success probability data,
(ii) combining the demand success probability data for two demands, thereby to determine the optimum success probability data for the two demands combined and the optimum distribution data for the combined demands,
(iii) storing the optimum success probability data and the optimum distribution data,
(iv) combining the optimum success probability data for the two combined demands with the demand success probability data of a further demand thereby to determine the optimum success probability data and the optimum distribution data for the combination of said two demands and said further demand,
(v) continuing said combination of optimum success probability data with remaining demand success probability data in turn until the optimum success probability data and the optimum distribution data for the combination of all the demands has been determined, and
(vi) physically indicating how the energy consuming resource should be optimally allocated in response to said demands according to said determination.

* * * * *